United States Patent
Hajost et al.

(10) Patent No.: US 10,341,303 B2
(45) Date of Patent: Jul. 2, 2019

(54) AUTOMATING THE CREATION AND MAINTENANCE OF POLICY COMPLIANT ENVIRONMENTS

(71) Applicant: SteelCloud, LLC, Ashburn, VA (US)

(72) Inventors: Brian H. Hajost, Great Falls, VA (US); Fredi Jaramillo, Ashburn, VA (US); Bao Nguyen, Ashburn, VA (US)

(73) Assignee: STEELCLOUD, LLC, Ashburn, VA (US)

(*) Notice: Subject to any disclaimer, the term of this patent is extended or adjusted under 35 U.S.C. 154(b) by 56 days.

(21) Appl. No.: 15/372,886

(22) Filed: Dec. 8, 2016

(65) Prior Publication Data

US 2017/0093813 A1 Mar. 30, 2017

Related U.S. Application Data

(63) Continuation of application No. 15/180,886, filed on Jun. 13, 2016, which is a continuation of application
(Continued)

(51) Int. Cl.
*H04L 29/06* (2006.01)
*G06F 21/60* (2013.01)
(Continued)

(52) U.S. Cl.
CPC ........ *H04L 63/0428* (2013.01); *G06F 21/602* (2013.01); *H04L 9/083* (2013.01);
(Continued)

(58) Field of Classification Search
CPC ............... H04L 63/0428; H04L 12/244; H04L 41/0893; G06F 21/602
See application file for complete search history.

(56) References Cited

U.S. PATENT DOCUMENTS 7,565,416 B1* 7/2009 Shafer ................. H04L 41/0813
  709/203
2003/0163559 A1* 8/2003 Dini .................... H04L 41/0893
  709/223
(Continued)

OTHER PUBLICATIONS

Wikipedia, "Configuration file", https://en.wikipedia.org/wiki/Configuration_file, accessed Jun. 11, 2018.*
(Continued)

*Primary Examiner* — Mahfuzur Rahman
*Assistant Examiner* — Darshan I Dhruv
(74) *Attorney, Agent, or Firm* — Steven M. Greenberg, Esq.; Shutts & Bowen LLP (57) ABSTRACT

Embodiments of the present invention provide for a method, system, and apparatus for creating a publishable computer file. The method includes selecting a first computer file encapsulating a source security policy for a computing device and creating a second computer file using the source security policy of the first computer file to create a local security policy and to encapsulate the created local security policy and also an operating system security policy. The method further includes calculating a hash value for the second computer file and storing the hash value in a header for the second computer file. The method yet further includes encrypting the second computer file, wherein the encrypted second computer file once loaded into memory of the computing device is processed by the computing device.

17 Claims, 5 Drawing Sheets

Related U.S. Application Data

No. 14/666,158, filed on Mar. 23, 2015, now Pat. No. 9,367,699, which is a continuation-in-part of application No. 13/761,514, filed on Feb. 7, 2013, now Pat. No. 8,990,559.

(51) Int. Cl.
 *H04L 9/08* (2006.01)
 *H04L 9/32* (2006.01)
(52) U.S. Cl.
 CPC .......... *H04L 9/0861* (2013.01); *H04L 9/0869* (2013.01); *H04L 9/3239* (2013.01); *H04L 63/123* (2013.01); *H04L 63/20* (2013.01)

(56) References Cited

U.S. PATENT DOCUMENTS

| | | | | |
|---|---|---|---|---|
| 2004/0205748 A1* | 10/2004 | Iyer | ............................ | G06F 8/71 717/174 |
| 2006/0015841 A1* | 1/2006 | Bishop | .................. | G06F 9/5077 717/102 |
| 2006/0236363 A1* | 10/2006 | Heard | .................... | H04L 63/101 726/1 |
| 2008/0070495 A1* | 3/2008 | Stricklen | .................. | H04W 8/22 455/3.01 |
| 2008/0184200 A1* | 7/2008 | Burns | .................. | G06F 9/44505 717/121 |
| 2009/0205012 A1* | 8/2009 | Jain | ........................ | G06F 21/577 726/1 |
| 2011/0093914 A1* | 4/2011 | Jacobson | ................. | H04L 29/06 726/1 |
| 2012/0198223 A1* | 8/2012 | Tukol | .................. | G06F 9/44505 713/2 |
| 2012/0210387 A1* | 8/2012 | Sampigethaya | ...... | H04L 63/104 726/1 |
| 2013/0238768 A1* | 9/2013 | Vaidya | .................... | H04L 67/14 709/220 |

OTHER PUBLICATIONS

Techopedia, "Configuration File (Config File)", https://www.techopedia.com/definition/3339/configuration-file-config-file, accessed Jun. 11, 2018.*

* cited by examiner

FIG. 3C ic illustration of a process for standardizing server policy compliance in a computing environment;

AUTOMATING THE CREATION AND MAINTENANCE OF POLICY COMPLIANT ENVIRONMENTS

CROSS-REFERENCE TO RELATED APPLICATIONS

This application is a Continuation of U.S. patent application Ser. No. 15/180,886, filed on Jun. 13, 2016, now pending, which is a Continuation of U.S. patent application Ser. No. 14/666,158, filed on Mar. 23, 2015, now U.S. Pat. No. 9,367,699, which is a Continuation-in-Part of U.S. application Ser. No. 13/761,514, filed Feb. 7, 2013, now U.S. Pat. No. 8,990,559, which are incorporated herein by reference in their entirety.

BACKGROUND OF THE INVENTION

Field of the Invention

The present invention relates to computer enterprise systems and more particularly to maintaining policy compliant computers in a computer enterprise system.

Description of the Related Art

In computing, hardening is the process of securing a system by reducing its surface vulnerability. This process can include reducing available vectors of attack by removing unnecessary software, usernames or logins, and disabling or removing services, which can lead to a more secure system. There are various methods of hardening systems, which can include applying a patch to the kernel, closing open network ports, and setting up intrusion-detection systems, firewalls, and intrusion prevision systems. In addition, there can be hardening scripts that can, for instance, deactivate unneeded features in configuration files or perform various other protective measures.

In the field of military networks, the "Security Technical Information Guides" (STIGs) are an example of a standard methodology for implementing and supporting technology on military networks. These STIGs can serve as a guide for hardening military networks. There can be different STIGs, each describing diverse aspects of a military network, such as the components of a compliant system, including various hardware, software, and infrastructure components, how a specific software application should be set-up and implemented to be compliant, and how a server and infrastructure may need to be hardened in order to run an application compliantly.

Currently, the only way to implement and maintain standardized computer policy (hardening) across and between enterprises is to describe the policy in a document. Some hardening policies can be extremely long—several hundred pages in length. In addition, these types of policies do not always include specification for all system components, such as structured query language (SQL) servers, .NET, or Internet Information Services (IIS). Further, some policy documents only describe the destination, but do not provide guidance on how to reach the destination. Without adequate guidance, someone, usually a system administrator or other expert, must review new STIGs, plan and strategize the implementation of the new STIGs, develop a team to implement such, hand implement and test each system, review the results, certify and approve the implementation, and then document and publish the work instructions so that technicians can implement the policy correctly on all systems. This process can take expertise, time, and money.

BRIEF SUMMARY OF THE INVENTION

Embodiments of the present invention address deficiencies of the art with respect to standardizing server policy compliance across computing environments and provide a novel and non-obvious method, system, and computer program product for creating a policy compliant environment. In an embodiment of the invention, an encrypted file can be loaded into memory of a computing device. The encrypted file can define a security policy for the computing device. The encrypted file can be validated to ensure an authenticity of the encrypted file and the security policy of a target computing device can be updated upon the successful validation of the encrypted file according to the validated encrypted file.

In another embodiment of the invention, a policy compliant system can be provided. The system can include a computer with at least one processor and memory and a policy compliance module. The module can include program code enabled upon execution in memory of the computer to load an encrypted file into memory of the computer. The encrypted file can define a security policy for the computer. The program code of the module can further include program code to validate the encrypted file to ensure an authenticity of the encrypted file and to update the security policy of a target computer in response to a successful validation of the encrypted file according to the validated encrypted file.

In a further embodiment of the invention, a method for creating a publishable computer file can be provided. The method can include selecting in memory of a computer, a first computer file encapsulating a source security policy for a computing device and creating, by a processor of the computer, a second computer file using the source security policy of the first computing file to create a local security policy and to encapsulate the created local security policy and also an operating system security policy. The method can further include calculating, by the processor of the computer, a hash value for the second computer file and storing the hash value in a header for the second computer file and encrypting, by the processor of the computer, the second computer file, where the encrypted second computer file once loaded into memory of the computing device is processed by the computing device so as to update a security policy of the computing device according to the operating system security policy and the local security policy encapsulated by the second computer file.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred; it being understood, however, that the invention is not limited to the precise arrangements and instrumentalities shown, wherein.

DETAILED DESCRIPTION OF THE INVENTION

Embodiments of the invention provide for creating a policy compliant environment on a computer. In accordance with an embodiment of the invention, a policy signature file can be created with respect to the implementation of a specific security policy. In particular, the policy signature file can be a single file that may contain a single policy or may contain multiple policy and configuration files along with other documents. In this way, the policy signature file denotes both security requirements and operational requirements. The policy signature file can be loaded into memory of a computer and the loaded policy signature file can be validated prior to updating a target computer according to the policy signature file. In this way, a standard mechanism can be provided to publish policies to different components in a computing environment, thus allowing policies to be moved across different domains, whether geographic or between customers, as well as allowing policies to be published to third parties.

Figure 1:
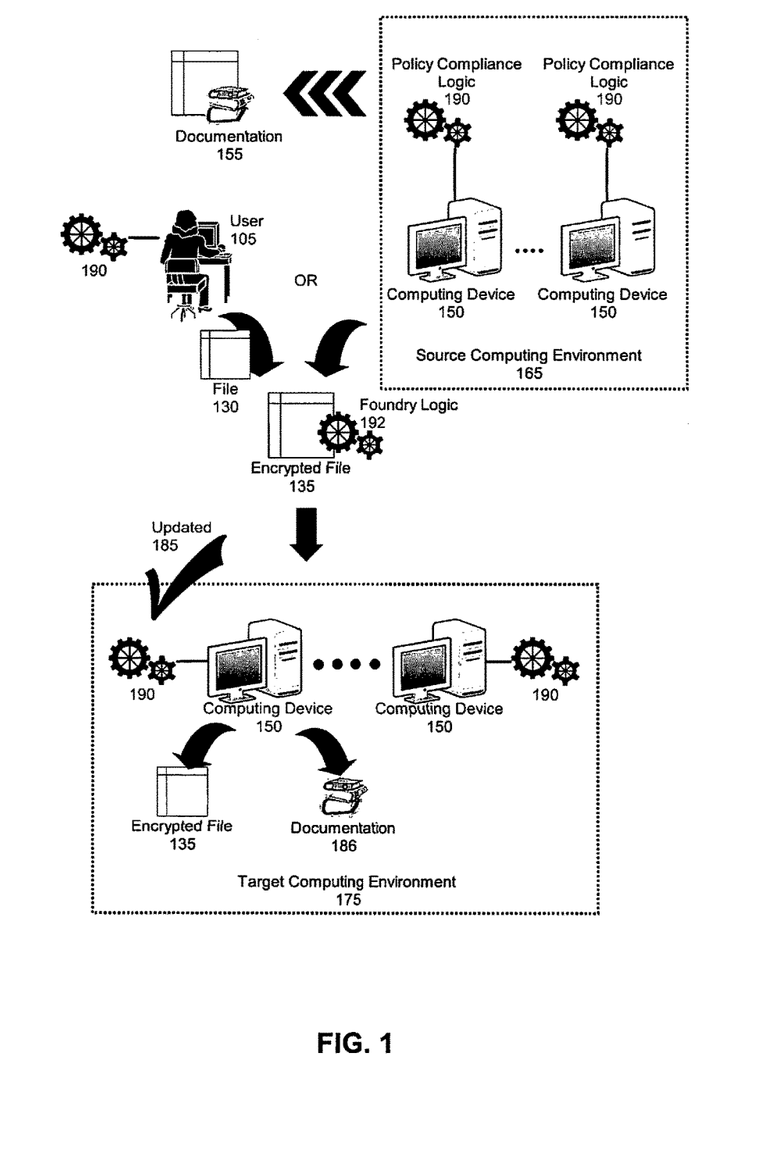
FIG. 1 is a pictorial illustration of a process for standardizing server policy compliance in a computing environment.

In further illustration, FIG. 1 depicts a process for standardizing server policy compliance in a computing environment. As seen in FIG. 1, a (computer) file 130 can be created in at least two different ways. In one instance, a user 105 can create the file 130 manually by transcribing a published policy standard, such as a STIG, and then modifying the file 130, if required, to the operational requirements of a target computing environment 175. The user 105 can then use a computer executing policy compliance logic 190 or foundry logic 192 to process the file 130 in order to create an encrypted file 135. In one instance, the file 130 is a computer text file that can be written in a variety of different formats, including but not limited to, Extensible Markup Language (XML). Further, the file 130 can define a security policy for a computer or application. More specifically, the file 130 can encompass all policy options as well as other environmental requirements necessary to update operating system policy and validate a computing device 150 as well as other components in a target computing environment 175. The components can include, but are not limited to, application software versions, browser versions, JAVA versions, system component versions, etc. Of note, in an embodiment, foundry logic 192 creates an encrypted file 135 from the file 130, but in a different embodiment, policy compliance logic 190 containing similar logic to foundry logic 192 creates an encrypted file 135 from the file 130.

More specifically, the encrypted file 135 is a single file that may contain a single policy or may contain multiple policy and configuration files along with other documents, where each policy or configuration file is an individual XML file that addresses policy or configuration of a specific operating system or piece of software. For example, the encrypted file 135 can include a standard STIG policy, an application-specific policy for a specific operation system, web browser STIG policies for specific web browser versions, the text from a specific STIG, waiver and Plan of Actions and Milestones (POA&M) information as well as other documentation, such as work and/or installation instructions. It is the foundry logic 192 or policy compliance logic 190 containing similar logic to the foundry logic 192 that allows a user, in an embodiment, to select files which will be encrypted by a foundry key file and to incorporate the selected filed into a single hashed file that can also be zipped. Of note, the foundry key file is created upon installation of the foundry logic 192 on a computing device 150, the foundry logic 192 utilizes a Federal Information Processing Standard (FIPS)-complaint random number generator to create a unique 256-bit key that is encrypted into two key files—the "foundry" key file and a "client" key file. The "foundry" key file is used by foundry logic 192 to encrypt files and the "client" key file is used by a client to de-encrypt files. It is further noted that the "client" key file is embedded in a client computing device upon installation of the client.

In another instance, policy compliance logic 190 on a computing device 150 in a source computing environment 165, where a new policy has already been implemented, tested, and approved for the desired system policy configuration, can also be used to create a file 130. In other words, a file 130 can be created from an already compliant system (compliant with a system policy configuration). The policy compliance logic 190 or foundry logic 192 can date as well as create a hash value and encrypt the file 130 to create an encrypted file 135. By dating, hashing, and encrypting the file 130, the encrypted file 135 is more protected from malicious or careless tampering. Further, the hash value of the encrypted file can be included in the encrypted file 135, such as in a header. Of note, policy compliance logic 190 can separate group policy from local policy and include (collapse) the local policy into the file 130. Of further note, the file 130 can be used as is upon its creation or can further be processed, for instance, by an user 105, to add information related to additional policy components that might not be already detailed in the file 130, such as application software versions, browser versions, other component versions, and JAVA versions. Of even further note, not all computing devices 150 will have the ability to create encrypted files 130. In other words, policy compliance logic 190 or foundry logic 190 can be restricted to certain computing devices 150 in order to prevent the creation of encrypted files 135, though all computing devices 150 can export (policy) files 130. For example, a client-side server can export files 130 (which define policies), but only certain computing devices 150, such as a computing device 150 containing foundry logic 192, for instance, can create encrypted files 135, which are both encrypted and include policy definitions. In addition, once an encrypted file 135 has been created, documentation 155 related to the contents of the encrypted file 135 can be created by policy compliance logic 190.

Upon the creation of the encrypted file 135, policy compliance logic 190 on any computing device 150 in a target computing environment 175 can load the encrypted file 135 into memory of the computing device 150. Of note, policy compliance logic 190 can be located on any server in any computing environment. The encrypted file 135, which has been dated, hashed, and encrypted can also be loaded from a variety of storage mediums, including but not limited to, a portable compact disc read-only memory (CD-ROM), an optical storage device, a magnetic storage device, a portable computer diskette, a hard disk, and a flash drive. In this way, the various storage media allow a validated encrypted file to be easily transferred to different computers across secure boundaries. Further, the encrypted file 135 can be loaded from any computing device 150 in the target computing environment 175 or from anywhere in a computing environment.

After loading the encrypted file 135, policy compliance logic 190 can validate the file 135 to ensure an authenticity of the encrypted file 130. Of note, the term "validation" or "to validate" refers to confirming the authenticity of the file 135. Validation of the encrypted file 135 can include policy compliance logic 190 recalculating a hash value for the encrypted file 135 and comparing the recalculated hash value to the hash value stored in the encrypted file 135 being loaded. Upon successful validation of the encrypted file 135, the computing device 150 in the target computing environment 175 (a target computing device) can be updated 185 in order to comply with security policy defined in the encrypted file 135. In this way, the (target) computing device 150 is now in compliance with a specific security policy. Once the loading process is complete, the process can be documented 186. In this way, the need to manually create documentation required to comply with internal controls can be reduced and/or eliminated. Documentation 186 can further reduce and/or eliminate the need to create work instructions that are often required to document a manual process for updating policy on target computers. In this way, compliance policy logic 190 can also provide a standardized facility that addresses policy updates with a simple uniform capability.

Policy compliance logic 190 can also compare multiple, different policies. For instance, when a computing environment is not operating properly and a policy issue is suspected, policy compliance logic 190 can be used to compare a policy in place before and after updating a computing device 150. Specifically, the logic 190 can be used to identify the deltas (differences) between different policies, such as group and local policies as well as policies in place before and after updating, so as to assist a user 105, such as a system administrator, in resolving problems in the target computing environment 175.

Figure 2:
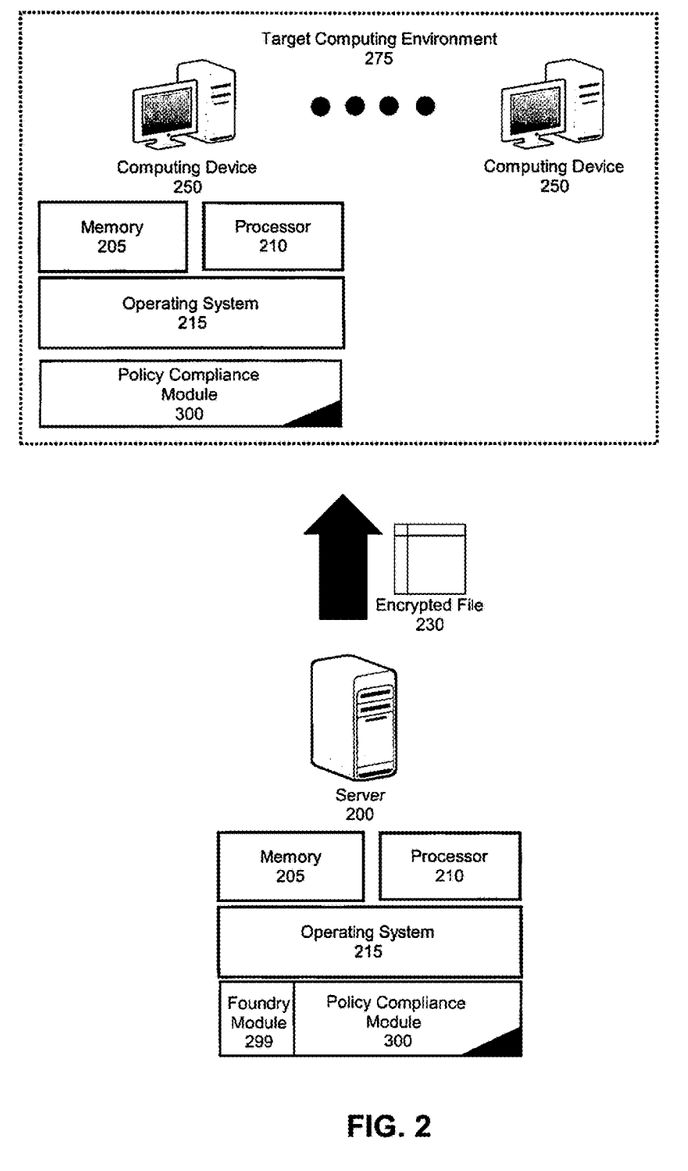
FIG. 2 is a schematic illustration of a policy compliance system configured to create a policy compliant computing environment.

The process described in connection with FIG. 1 can be implemented in a policy compliance system. In further illustration, FIG. 2 schematically shows a policy compliance system configured to create a policy compliant computing environment. The policy compliance system can include at least one computing device, such as a server 200. The server 200 includes at least one processor 210 and memory 205 supporting the execution of an operating system (O/S) 215. The O/S 215 can, in turn, support a policy compliance module 300. The policy compliance module 300 can be used to create an encrypted file 230 as well as to update a computing device 250 using an encrypted file 230 in a target computing environment 275 to make the computing device 250 compliant with a security policy. In other words, the policy compliance module 300 can include program code, which, when executed by at least one processor 210 of a computing device 250, such as a server 200, can create an encrypted file 230. Of note, though the policy compliance module 300 can be on any computing device 250, not all computing devices 250 executing the module 300 will be able to create an encrypted file 230. In other words, the ability to create encrypted files 230 will be limited. This can be accomplished, for example, in an embodiment, by incorporating the program code used to create an encrypted file 230 as part of a different module, such as a foundry module 299. In other words, the foundry module 299 can contain the logic (the program code) to create a dated, encrypted, and hashed file. The program code of a foundry module 299, in an embodiment, can be integrated with the program code of a policy compliance module 300. In a different embodiment, the foundry module 299 can be a separate component, which would then interact with the policy compliance module 300. In any embodiment, only computing devices 250 containing the foundry module 299 or the program code used to create the encrypted file 230 can actually create the encrypted file 230. Of note, the number of computing devices that contain the foundry module 299 is determined by publishing control points within an enterprise rather than capacity or throughput. Though all computing devices 250, with or without the foundry module 299, but with the policy compliance module 300, can export a (policy) file.

Specifically, the program code of the policy compliance module 300 or a foundry module 299 can create an encrypted file 230 by using a security policy from a source computer system; the security policy can be described in a computer file, written in an Extensible Markup Language (XML) format and can serve as a base for creating an encrypted file 230. Yet even more specifically, the encrypted file 230 is a single file that may contain a single policy or may contain multiple policy and configuration files along with other documents, where each policy or configuration file is an individual XML file that addresses policy or configuration of a specific operating system or piece of software. In other words, the encrypted file 230 can encapsulate a created local security policy and also an operating system security policy that incorporates at least a portion of the security policy of the source computer system. Of note, security mechanisms ensures that a computing device 250 only uses an encrypted file 230 corresponding to a prescribed foundry module(s) 299. Of further note, in an embodiment, an end user can select a source security policy. In another embodiment, program code of a policy compliance module 300 can identify a security policy source. The source computer system can be any computing device in a computing environment, but would most often be a computer system in which a new policy configuration has already been implemented, tested, and approved. To the computer file (describing the security policy), local policy can be added in response to program code of the module 300 separating group policy from local policy. Further, the policy compliance module 300 or a foundry module 299 can include program code to hash and encrypt the computer file to create the encrypted file 230. Even further, the module 300 or a foundry module 299 can include program code to insert a date into the computer file before it is encrypted. The encrypted file 230, with or without the inserted date, is now in a standard format that can be transferred across security boundaries via any method now known or later developed, such as on a CD, DVD, flash drive, etc., and used to update a target computer system. In this way, the encrypted file 230 can be loaded into memory of a target computer system and processed by the target computer system so that a security policy of the target computer system can be updated according to the operating system security policy and the local security policy encapsulated by the encrypted file 230. The module 300 can also include program code to document the creation of the encrypted file 230.

With respect to the foundry module 299, upon installation of the foundry module 299 on a computing device 250 or a server 200, the program code of the foundry module 299 utilizes a Federal Information Processing Standard (FIPS)-complaint random number generator to create a unique 256-bit key that is encrypted into two key files—a "foundry" key file and a "client" key file. Of note, though FIG. 2 illustrates a foundry module associated with a server 200, it is understood that the foundry module 299 can be installed on any computer, including servers 200 and computing devices 250. However, as indicated herein the number of computers with the foundry module 299 will be limited as determined by desired publishing control points.

After the key files have been created, the "foundry" key file can then be used to install one or more foundries (foundry modules 299) and the "client" key file is used on clients, such as computing devices 250. More specifically, the "client" key file is embedded on the client during installation of the client. Of note, by using separate key files, a key (client key file) that is distributed with a client for installation cannot be used to set up a rogue foundry module 299. In particular, this is accomplished, in part, by binding a specific foundry module 299 to a client (computing device 250) using the "client" key file. Additionally, the client re-encrypts the "client" key file produced by the specific foundry module 299. This ensures that the "client" key file cannot be exchanged after installation. In this way, the key files are bound to the installation of the foundry module 299 rather than a specific computing device 250. It is further noted that when a new or an additional foundry module 299 is installed, a user can choose to implement a "foundry" key file that has already been generated by an existing foundry. This allows a user to set up more than one foundry module 299 to service a set of clients (computing devices 250).

Of note, the contents of an encrypted file 230 can also be created by an end user. One way the contents of an encrypted file 230 can be created is by a user taking a published policy standard and transcribing it into the file format, which, in one instance, is based in XML. The user can then modify the created file, if required, to the operational requirements of a target computer. Policy compliance module 300 or a foundry module 299 can further process the manually created file to create an encrypted file 230.

The policy compliance module 300 can also be used to update server policy settings on a computing device 250 in a target computing environment 275. In an embodiment, the policy compliance module 300 can include program code to load an encrypted file 230. Upon loading of the encrypted file 230, program code of the policy compliance module 300 can validate the loaded encrypted file 230 to ensure the authenticity of the encrypted file 230. One way the loaded encrypted file 230 can be validated is program code on the module 300 can calculate a hash value of the loaded encrypted file 230 and compare it to a hash value stored in the encrypted file 230, which was added to the encrypted file 230 during its creation. Once the encrypted file 230 has been validated, the program code of the policy compliance module 300 can update the security policy of the computing device 250. In this way, the target computing device 250 is compliant with new security policies denoted in the encrypted file 230. Further, the policy compliance module 300 can include program code to document this process.

Of note, the policy compliance module 300 can include program code to compare security policies from before and after updating. Specifically, in an embodiment, pre- and post-group policies can be compared by the program code in the module 300 by identifying the deltas between the policies. The deltas can be displayed on a computer screen to a user so the user can troubleshoot policy-based operation issues.

Figure 3A:
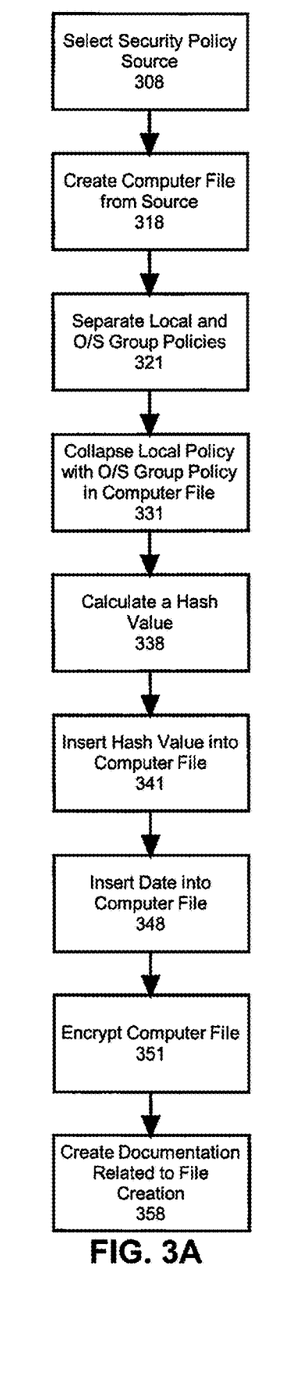
FIG. 3A is a flow chart illustrating a process for creating an encrypted file used in standardizing a policy compliant computer environment.

In even yet further illustration of the operation of the program code for the policy compliance module 300, FIG. 3A shows a flow chart illustrating a process for creating an encrypted file that can be used in standardizing a policy compliant computer environment. The program code of the policy compliance module 300 can create a computer file from a security policy of a source system upon the selection of a security policy source. Of note, the source system can be a system that has implemented, tested, and approved a system policy configuration. The security policy source can be selected by a user or by the module 300, as indicated in block 308. Upon the selection of the security policy source, a computer file can be created encapsulating the security policy source, as shown in block 318. Of note, this computer file can serve as a base, which is modified during the creation of the encrypted file. Of further note, a user can also create a base file that is further processed by the module 300 or the foundry module 299, so that a properly formatted encrypted file is created. The user creates a base file from transcribing a published policy standard into the same format, such as XML. A user can then modify the base file with any operational requirements related to the target computing device or application.

Optionally, in the case of a (base) computer file being created from a source system, a check, such as manually opening the computer file and reviewing it to determine that the computer file appears as expected, of the computer file can be performed by a user. If required, the user can manually add additional policy components that might not already be detailed in the computer file if the user determines during the review that any policy components are missing. In another embodiment of the invention, the program code of the module 300 or the foundry module 299 can allow a user to build the computer file. Specifically, with respect to creating a computer file from a source system, the program code of the module 300 or the foundry module 299 can include program code that displays on a single computer screen, a source computer file and a master signature. In this way, a user can monitor and compare changes made. Additionally, the program code of the module 300 or the foundry module 299 can show differences with color coding, allowing a user to visualize differences. The user can ultimately build the encrypted computer file without ever touching the underlying XML.

In block 321, the policy compliance module 300 can separate local policy from operating system group policy upon identifying local security policy and operating system group security policy. The module 300 can collapse local policy into the computer file in the correct format, as indicated in block 331. In an embodiment, the computer file can be in a XML-based format. In block 338, a hash value can be calculated and then, as indicated in block 341, inserted into the computer file. The hash value can be placed anywhere in the file, but, in one instance, it is stored in the header of the computer file. The policy compliance module 300 can further insert a date into the computer file, as in block 348. The date can be just the date, the date and time, just the time, or any combination of time and date. The computer file can then be encrypted, as shown in block 351. The policy compliance module 300 can further create documentation related to the creation of the encrypted file, as is shown in block 358.

Of note, in an embodiment that implores a foundry module 299, the program code of the foundry module 299 can complete any or all of the actions described in blocks 338 through 351 of FIG. 3A. More particularly, as shown in FIG. 3C, upon the installation of the foundry module 299, as shown in block 353, the program code of the foundry module 299 utilize a FIPS-complaint random number generator to create a unique 256-bit key, as shown in block 356. The unique 256-bit key can then be encrypted into two key files—a foundry key file and a client key file, as illustrated in block 358. As shown in block 362, the foundry key file and the client key file can then be distributed to a client (a computing device acting as a client and without the foundry module 299) and to a computing device with the foundry module. Of note, there are no public and private keys used, but instead, it is the key files that are used. On a client, a specific foundry module 299 can be bound to a specific client using the client key file, as shown in block 374. Of note, the client key file is embedded in the client upon installation of the client. Additionally, as illustrated in block 376, the client re-encrypts the client key file produced by the specific foundry module 299. This ensures that the client key file cannot be exchanged after installation.

On the computing device with the foundry module 299, the program code of the foundry module 299 can calculate a hash value of a computer file (block 364), insert the hash value into the computer file (block 366), insert a date into the computer file (block 368), and encrypt the computer file (block 372). The foundry module 299 can also create documentation related to the creation of the encrypted file, as is shown in block 374. The documentation can also describe the contents of the encrypted file. Of note, at each step or at the conclusion of several steps, a log can also be maintained, which records the details of all activity.

Of further note, in a computing environment in which the module 300 is deployed on multiple, different computing devices in the environment, not all of the computing devices will have the ability to create encrypted files. In other words, only computing devices that contain the foundry module 299 or the program code contained in the foundry module will be able to create encrypted files, though all computing devices with the policy compliance module 300 have the ability to export policies (the created policy computer file as described by the actions described in blocks 308 through 331). The number of computing devices that contain the foundry module 299 is determined by publishing control points within an enterprise rather than capacity or throughput.

Figure 3B:
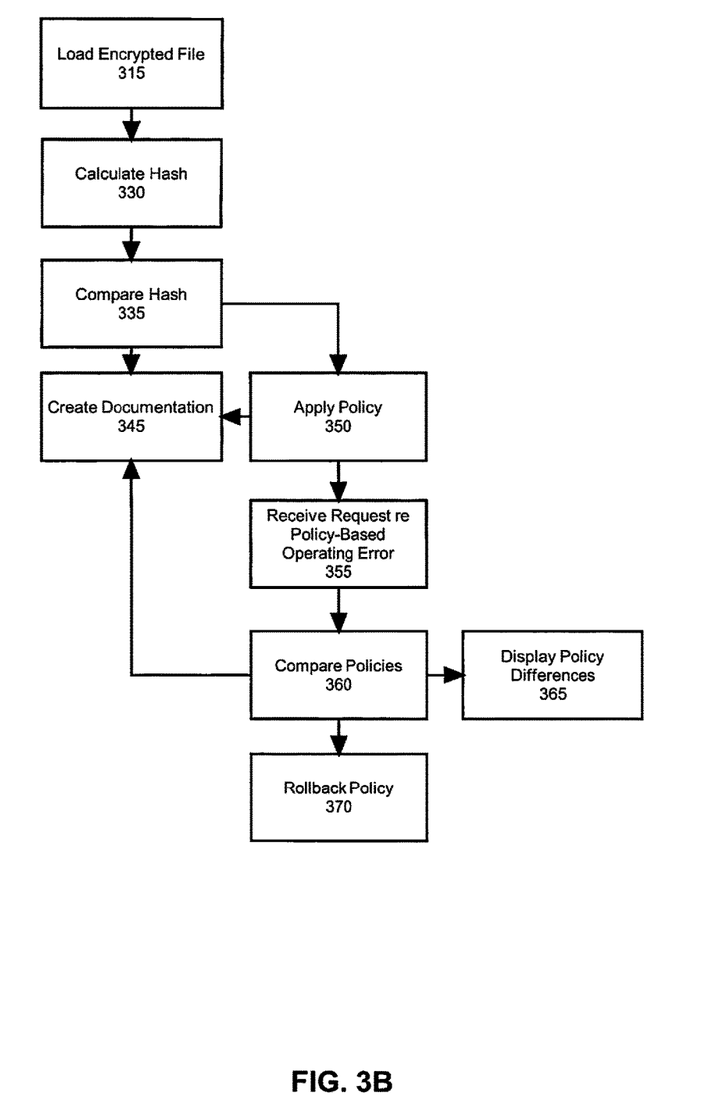
FIG. 3B is a flow chart illustrating a process for standardizing a policy compliant computer environment; and, FIG. 3C is a flow chart illustrating a process for creating an encrypted file using a foundry module.
Figure 3C:
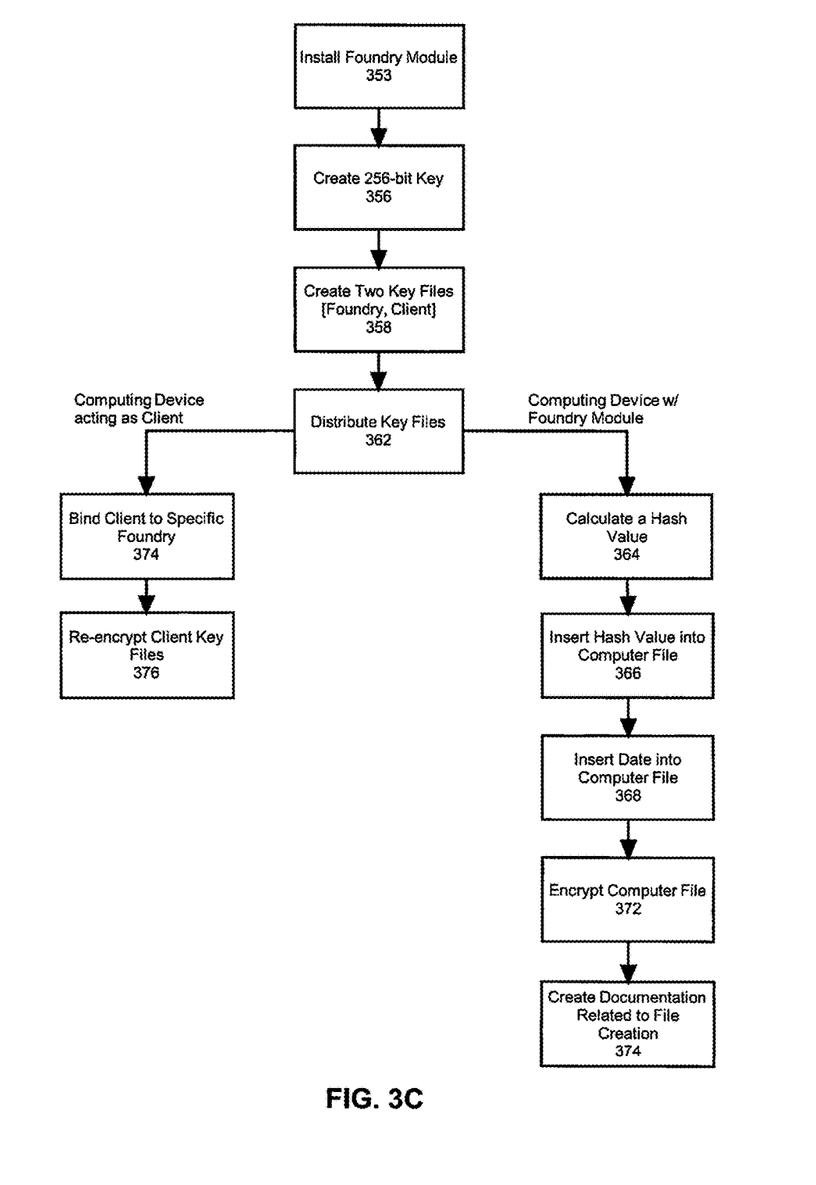

In even yet further illustration of the operation of the program code for the policy compliance module 300, FIG. 3B is a flow chart illustrating a process for standardizing a policy compliant computer environment using an encrypted file, which defines a security policy for a specific application or environment. A policy compliance module 300 can load an encrypted file into memory of a computing device, as shown in block 315. The encrypted file can be validated by the module 300 to ensure the authenticity of the encrypted file, in one instance, by calculating a hash value of the imported encrypted file, as illustrated in block 330, and by comparing the calculated hash value to the hash value inserted into the encrypted file during its creation, as in block 335. In block 345, the policy compliance module 300 can create documentation related to the importation and validation of the encrypted file. In addition, the policy compliance module 300 can log all activities of the module 300.

Upon the validation of the encrypted file, the policy settings defined in the validated encrypted file can be applied to a target computing device, as shown in block 350. In other words, updates to the server policy setting which the policy compliance module 300 is executing can be acted upon. Further, as shown in block 345, documentation related to the application of the policies denoted in the validated encrypted file can be created.

The policy compliance module 300 can also be used when a system is not operating correctly. The module 300 can compare multiple, different policies, as shown in block 360, in response to receiving a request regarding a potential policy-based operating error, as in block 355. The different polices can include the policies related to the policy configuration before and after updating as well as policies related to group and local policies. In an embodiment, the policy compliance module 300 can determine the deltas or differences between a set of policies. Further, documentation related to the comparison of polices can be created, as in block 345. As shown in block 365, the policy differences can then be displayed. In this way, the module 300 can be used to debug policy issues, including in instances when group policies are downloaded when a server logs into a domain. Further, the policy compliance module 300 can be used to rollback a computer to a previous policy, as illustrated in block 370. Of note, the module 300 can also create a history of all executed tasks.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied therein.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device. With specific reference to a computer readable storage medium, it is to be understood that a computer readable storage medium excludes transitory media, such as transitory signals and other propagation media.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied in a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object-oriented programming language and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatuses (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the blocks might occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other device to cause a series of operational steps to be performed on the computer, other programmable apparatus or other device to produce a computer implemented process such that the instructions which execute on the computer or other programmable apparatus provide processes for implementing the functions/acts specified in the flowcharts and/or block diagram block or blocks.

Finally, the terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, denote the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step-plus-function elements in the claims below are intended to include any structure, material, or act for performing the function in combination with other claimed elements as specifically noted. The depiction of the present invention has been offered for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention in various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:
1. A method for creating a policy compliant computing environment for a target computing device, comprising:
    receiving, from an electronic device, a customized file incorporating a published policy standard modified for a set of operational requirements defined for the target computing device;
    loading the customized file into a memory of the target computing device;
    validating the customized file subsequent to loading the customized file into the memory of the target computing device;
    parsing the customized file to determine one or more requirements for the target computing device dictated by the published policy standard and the one or more modifications for the set of operational requirements, wherein the one or more requirements include an operating system security policy and a local security policy;
    comparing current settings of the target computing device to the one or more requirements defined in the customized file, where a difference between the current settings and the one or more requirements indicates the target computing device is out of compliance;
    updating the current settings of the target computing device to satisfy the one or more requirements dictated by the published policy standard and the one or more modifications for the set of operational requirements defined in the customized file, thereby ensuring the target computing device maintains compliance; and creating a log that records details of the updating the current settings of the target computing device.

2. The method of claim 1, wherein validating the customized file subsequent to loading the customized file into the memory of the target computing device comprises validating the customized file to ensure an authenticity of the customized file.

3. The method of claim 1, further comprising:
creating documentation subsequent to one or more of loading of the customized file, comparing the current settings of the target computing device to the one or more requirements defined in the customized file, and updating the current settings of the target computing device.

4. The method of claim 1, wherein comparing the current settings of the target computing device to the one or more requirements defined in the customized file comprises determining differences between the current settings and the one or more requirements.

5. The method of claim 1, further comprises:
rolling back the current settings of the target computing device to settings in existence prior to updating the current settings of the target computing device.

6. A system for creating a policy compliant environment for a target computing device, comprising:
a policy compliance module executing in a memory of a computer, the policy compliance module comprising program code which when executed by a processor of the computer enables the computer to:
receive, from an electronic device, a customized file incorporating a published policy standard modified for a set of operational requirements defined for the target computing device;
load the customized file into the memory of the target computing device;
validate the customized file subsequent to loading the customized file into the memory of the target computing device;
parse the customized file to determine one or more requirements for the target computing device dictated by the published policy standard and the one or more modifications for the set of operational requirements, wherein the one or more requirements include an operating system security policy and a local security policy;
compare current settings of the target computing device to the one or more requirements defined in the customized file, where a difference between the current settings and the one or more requirements indicates the target computing device is out of compliance;
update the current settings of the target computing device to satisfy the one or more requirements dictated by the published policy standard and the one or more modifications for the set of operational requirements defined in the customized file, thereby ensuring the target computing device maintains compliance; and
create a log that records details of the updating the current settings of the target computing device.

7. The system of claim 6, wherein the computer is the target computing device.

8. The system of claim 6, wherein the electronic device is a source computer.

9. The system of claim 6, wherein the electronic device is a storage medium.

10. The system of claim 6, wherein the program code which when executed by the processor of the computer further enables the computer to create documentation subsequent to one or more of loading of the customized file, comparing the current settings of the target computing device to the one or more requirements defined in the customized file, and updating the current settings of the target computing device.

11. The system of claim 6, wherein the program code which when executed by the processor of the computer further enables the computer to roll back the current settings of the target computing device to settings in existence prior to updating the current settings of the target computing device.

12. A computer program product for creating a policy compliant environment for a target computing device, the computer program product comprising:
a non-transitory computer readable storage medium having a set of instructions embodied therewith that when executed by a processor of a computer causes the computer to:
receive, from an electronic device, a customized file incorporating a published policy standard modified for a set of operational requirements defined for the target computing device;
load the customized file into the memory of the target computing device;
validate the customized file subsequent to loading the customized file into the memory of the target computing device;
parse the customized file to determine one or more requirements for the target computing device dictated by the published policy standard and the one or more modifications for the set of operational requirements, wherein the one or more requirements include an operating system security policy and a local security policy;
compare current settings of the target computing device to the one or more requirements defined in the customized file, where a difference between the current settings and the one or more requirements indicates the target computing device is out of compliance;
update the current settings of the target computing device to satisfy the one or more requirements dictated by the published policy standard and the one or more modifications for the set of operational requirements defined in the customized file, thereby ensuring the target computing device maintains compliance; and
create a log that records details of the updating the current settings of the target computing device.

13. The computer program product of claim 12, wherein the set of instructions that when executed by the processor of the computer further causes the computer to create documentation subsequent to one or more of loading of the customized file, comparing the current settings of the target computing device to the one or more requirements defined in the customized file, and updating the current settings of the target computing device.

14. The computer program product of claim 12, wherein the set of instructions that when executed by the processor of the computer further causes the computer to roll back the current settings of the target computing device to settings in existence prior to updating the current settings of the target computing device.

15. The method of claim 1, wherein the difference between the current settings and the one or more requirements identifies a potential policy-based operating error.

16. The system of claim 6, wherein the difference between the current settings and the one or more requirements identifies a potential policy-based operating error.

17. The computer program product of claim 12, wherein the difference between the current settings and the one or more requirements identifies a potential policy-based operating error.

* * * * *